United States Patent
Hsieh

(10) Patent No.: US 10,802,750 B2
(45) Date of Patent: Oct. 13, 2020

(54) UNIVERSAL FLASH STORAGE MEMORY MODULE, CONTROLLER AND ELECTRONIC DEVICE WITH ADVANCED TURBO WRITE BUFFER AND METHOD FOR OPERATING THE MEMORY MODULE

(71) Applicant: Silicon Motion Inc., Hsinchu County (TW)

(72) Inventor: Chao-Kuei Hsieh, Hsinchu County (TW)

(73) Assignee: SILICON MOTION INC., Hsinchu County (TW)

( * ) Notice: Subject to any disclaimer, the term of this patent is extended or adjusted under 35 U.S.C. 154(b) by 0 days.

(21) Appl. No.: 16/288,361

(22) Filed: Feb. 28, 2019

(65) Prior Publication Data

US 2020/0278806 A1 Sep. 3, 2020

(51) Int. Cl.
*G06F 13/00* (2006.01)
*G06F 3/06* (2006.01)

(52) U.S. Cl.
CPC ............ *G06F 3/0656* (2013.01); *G06F 3/061* (2013.01); *G06F 3/0679* (2013.01)

(58) Field of Classification Search
CPC ....... G06F 3/0656; G06F 3/0679; G06F 3/061
See application file for complete search history.

(56) References Cited

U.S. PATENT DOCUMENTS

| | | | | |
|---|---|---|---|---|
| 2011/0276775 A1* | 11/2011 | Schuetz | ............ | G06F 13/1673 711/165 |
| 2013/0073793 A1 | 3/2013 | Yamagishi et al. | | |
| 2015/0180790 A1* | 6/2015 | Rimmer | ............ | G06F 5/065 370/368 |
| 2016/0179617 A1 | 6/2016 | Lee | | |
| 2019/0121567 A1* | 4/2019 | Kim | ............ | G06F 3/0647 |
| 2019/0180793 A1* | 6/2019 | Berman | ............ | G11C 5/141 |
| 2020/0050366 A1* | 2/2020 | Bavishi | ............ | G06F 3/0604 |

FOREIGN PATENT DOCUMENTS

| | | |
|---|---|---|
| CN | 106295373 A | 1/2017 |
| CN | 106453730 A | 2/2017 |
| CN | 107332670 | 11/2017 |

OTHER PUBLICATIONS

"Samsung SSD TurboWrite Technology", Whitepaper by Samsung, 2013 (Year: 2013).*
International Search Report and Written Opinion dated Mar. 18, 2020 for related matter PCT/CN2019/126666 filed on Dec. 19, 2019. pp. 1-9.

* cited by examiner

*Primary Examiner* — Jing-Yih Shyu
(74) *Attorney, Agent, or Firm* — Duane Morris LLP

(57) ABSTRACT

A Universal Flash Storage (UFS) memory module including an input/output interface, a flash memory and a controller, and a method for operating a UFS memory module are disclosed. The flash memory includes: a write buffer portion; and a normal storage portion having a plurality of logic units. The controller includes: a processor; a first register indicating a maximum size of the write buffer portion; a second register indicating an available size of the write buffer portion; and a third. If the third register indicates the UFS memory module is in a shared buffer mode, the write buffer portion only includes a first shared buffer area. If the third register indicates the UFS memory module is in an advanced mode, the write buffer portion includes at least one dedicated buffer area, each corresponding to one of the plurality of logic units.

20 Claims, 4 Drawing Sheets

| LU | Mode | Size |
|---|---|---|
| 312 | Dedicated size | 512MB |
| 314 | Dedicated size | 512MB |
| 316 | Dedicated size | 1GB |
| 318 | Dedicated size | 0 |
| 320 | Dedicated size | 0 |

| LU | Mode | Size |
|---|---|---|
| 512 | Shared remaining | 1GB |
| 514 | Dedicated size | 512MB |
| 516 | Dedicated size | 512MB |
| 518 | Dedicated size | 0 |
| 520 | Shared remaining | 1GB |

UNIVERSAL FLASH STORAGE MEMORY MODULE, CONTROLLER AND ELECTRONIC DEVICE WITH ADVANCED TURBO WRITE BUFFER AND METHOD FOR OPERATING THE MEMORY MODULE

TECHNICAL FIELD

This disclosure relates generally to a storage device, and in particular but not exclusively, relates to a Universal Flash Storage (UFS) memory module.

BACKGROUND INFORMATION

Universal Flash Storage (UFS) memory module is used for data storage for electronic devices such as smart phones. It is generally included in an electronic device comprising a storage space and a controller.

For expediting write operations of the UFS memory module, the storage space may include a turbo write buffer and a normal storage portion. The turbo write buffer is configured to have a higher write speed than the normal storage portion. The data received from the electronic device would be stored temporarily in the turbo write buffer, and then flushed into the normal storage portion, so as to be stably saved in the UFS memory module. By doing so, the write speed of the UFS memory module increases.

SUMMARY

The normal storage portion is usually divided into multiple parts, wherein each part may be a logic unit for data storage. One objective of the present invention is to propose a mechanism for arranging write buffer(s) for the normal storage portion. For example, a write buffer may be configured to be dedicated to a logic unit or may be configured to be shared by a plurality of logic units.

In some embodiments, a UFS memory module comprises an input/output interface including: a clock pin for receiving a reference clock signal from a host; a pair of differential input pins for receiving data from the host; and a pair of differential output pins for transmitting data to the host; a flash memory including: a write buffer portion; and a normal storage portion having a plurality of logic units; and a controller including: a processor; a first register indicating a maximum size of the write buffer portion; a second register indicating an available size of the write buffer portion; and a third register indicating whether the UFS memory module is in a shared buffer mode or an advanced mode; wherein if the third register indicates the UFS memory module is in the shared buffer mode, the write buffer portion only includes a first shared buffer area; and if the third register indicates the UFS memory module is in the advanced mode, the write buffer portion includes at least one dedicated buffer area, each dedicated buffer area corresponding to one of the plurality of logic units.

In some embodiments, if the third register indicates the UFS memory module is in the shared buffer mode, the controller further includes a fourth register indicating a usage status of the first shared buffer area. If the third register indicates the UFS memory module is in the advanced mode, the controller further includes a plurality of fifth registers, each fifth register for one of the pluralities of logic units, and each fifth register indicating a size of a dedicated buffer area for a corresponding logic unit.

In some embodiments, if the third register indicates the UFS memory module is in the advanced mode, the write buffer portion may further include a second shared buffer area, and the controller may further include at least one sixth register for the at least one dedicated buffer area, each sixth register for one of the at least one dedicated buffer area, and each sixth register indicating a size of a dedicated buffer area. The controller further includes a seventh register indicating a usage status of the second shared buffer area, and a plurality of eighth registers, each eighth register for one of the plurality of logic units, and each eighth register indicating whether a logic unit uses the second shared buffer area.

In some embodiments, a controller of a flash memory includes a write buffer portion and a normal storage portion having a plurality of logic units, the controller comprising: a processor; a first register indicating a maximum size of the write buffer portion; a second register indicating an available size of the write buffer portion; and a third register indicating the flash memory is in a shared buffer mode or an advanced mode; wherein if the third register indicates the flash memory is in the shared buffer mode, the write buffer portion only includes a first shared buffer area; and if the third register indicates the flash memory is in the advanced mode, the write buffer portion includes at least one dedicated buffer area, each dedicated buffer area corresponding to one of the plurality of logic units.

In some embodiments, if the third register indicates the flash memory is in the shared buffer mode, the controller further includes a fourth register indicating a usage status of the first shared buffer area. If the third register indicates the flash memory is in the advanced mode, the controller further includes a plurality of fifth registers, each fifth register for one of the plurality of logic units, and each fifth register indicating a size of a dedicated buffer area for a corresponding logic unit.

In some embodiments, if the third register indicates the flash memory is in the advanced mode, the write buffer portion may further include a second shared buffer area, and the controller may further include at least one sixth register for the at least one dedicated buffer area, each sixth register for one of the at least one dedicated buffer area, and each sixth register indicating a size of a dedicated buffer area. The controller may further include a seventh register indicating a usage status of the second shared buffer area, and a plurality of eighth registers, each eighth register for one of the plurality of logic units, and each eighth register indicating whether a logic unit uses the second shared buffer area. If a logic unit uses neither a dedicated buffer area nor a shared buffer area, an eighth register of the logic unit indicates the logic unit using a dedicated buffer of size 0.

In yet another embodiment, an electronic device comprising the UFS memory module described above is provided.

In some embodiments, a method for operating a UFS memory module is provided. The UFS memory module includes a flash memory having a write buffer portion and a normal storage portion, where the write buffer portion has a dedicated buffer area and a shared buffer area. The method comprises: receiving, from the host, first data to be stored in the normal storage portion of the flash memory; writing the first data into the shared buffer area of the write buffer portion of the flash memory; receiving, from the host, second data to be stored in the normal storage portion of the flash memory; writing the second data into the dedicated buffer area of the write buffer portion of the flash memory; and flushing the first data and the second data into the normal storage portion of the flash memory.

These and other aspects of the invention are described further below with reference to the figures. The other objectives of the present invention will no doubt become obvious to those of ordinary skill in the art after reading the following detailed description of the embodiments that are illustrated in the various figures and drawings.

DETAILED DESCRIPTION

The embodiments of the present disclosure are described in detail with reference to the accompanying drawings. The following embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the present disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the present disclosure may be combined in any suitable manner in one or more embodiments. One skilled in the relevant art will recognize that the present disclosure may be practiced without one or more of the specific features or advantages of a particular embodiment. In other instances, additional features and advantages may be recognized in certain embodiments that may not be present in all embodiments of the present disclosure.

Figure 1:
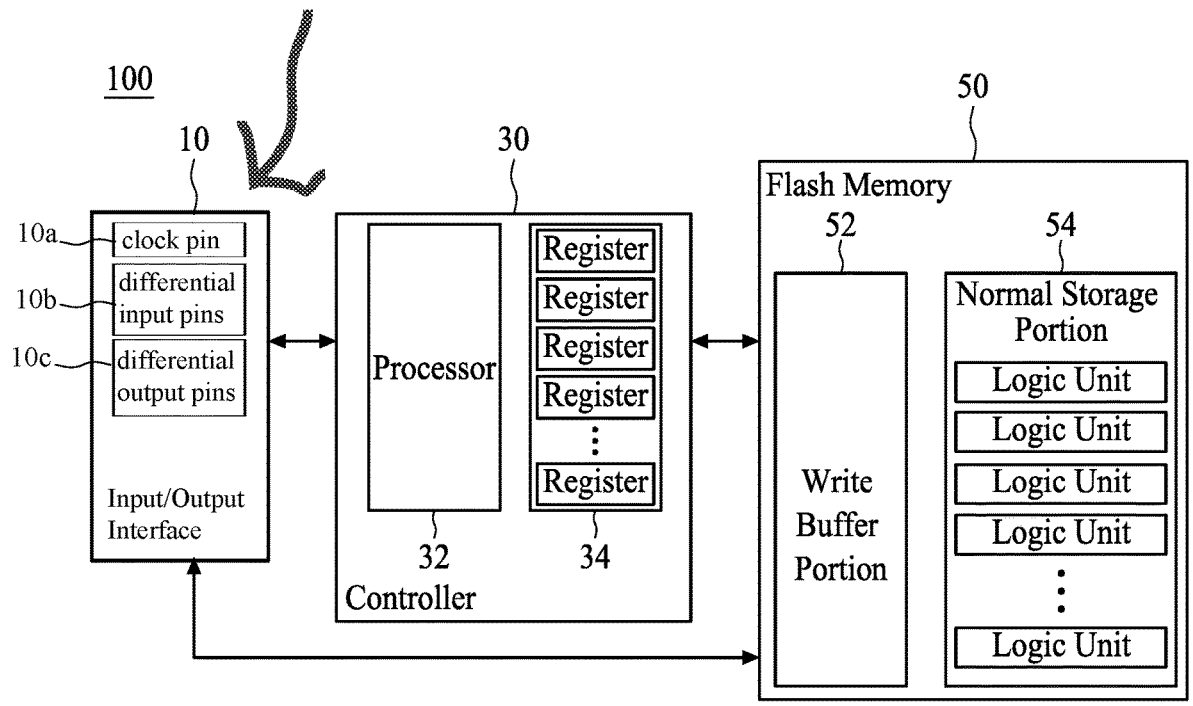
FIG. 1 is a block diagram schematically illustrating one example of the Universal Flash Storage (UFS) memory module in accordance with some embodiments of the disclosure.

FIG. 1 is a block diagram schematically illustrating one example of the Universal Flash Storage (UFS) memory module 100 in accordance with some embodiments of the disclosure. The UFS memory module 100 may be included in a host, such as an electronic device (not shown). Generally, the host may be a mobile phone or other portable electronic device. The UFS memory module 100 comprises an input/output interface 10 connecting to the host, a flash memory 50, and a controller 30. The controller 30 is electrically connected to the input/output interface 10 and the flash memory 50 of the UFS memory module 100. The flash memory 50 is also electrically connected to the input/output interface 10, so that the data received from the host through the input/output interface 10 can be stored in the flash memory 50 of the UFS memory module 100.

In some embodiments, the input/output interface 10 includes a clock pin 1 for receiving a reference clock signal from the host, a pair of differential input pins b for receiving data from the host, and a pair of differential output pins for transmitting data to the host.

The flash memory 50 comprises a write buffer portion 52 and a normal storage portion 54, which has a plurality of logic units. The data received from the host would be stored temporarily in the write buffer portion 52, and then flushed into the normal storage portion 54 with the plurality of logic units. Afterward, the data is stably stored in the logic unit(s) of the normal storage portion 54.

In some preferred embodiments, the flash memory 50 is formed by multi-level cells or triple-level cells. However, a part of the flash memory 50 is arranged as the write buffer portion 52 and is utilized as single-level cells. Thus, the speed of writing data into the write buffer portion 52 and the responding speed of the write buffer portion 52 is significantly higher than any other portion of the flash memory 50, which is used as multi-level cells or triple-level cells. Such arrangement enables the turbo write operation.

The controller 30 comprises a processor 32 and a plurality of registers 34. The processor 32 is configured to process the instruction or data received from the host and to generate response information to the host. For instance, if the host sends an instruction to perform the turbo write operation, the processor 32 may enable the write buffer portion 52 and select suitable logic units for storing data. For another instance, if the host sends a flushing command, the processor 32 may enable the data flush from the write buffer portion 52 to the normal storage portion 54. The registers 34 may be stored in one physical memory module in the controller 30, or may be distributed to more than one physical memory modules in the controller 30. The content stored in the registers 34 indicates status or information of the write buffer portion 52.

The registers 34 may include device level registers and logic unit level registers. The device level registers store information of UFS memory module and the write buffer of the UFS memory module. The logic unit level registers store information of the logic units and buffer areas of the logic units. For example, the controller 30 has a device level register preconfigured to indicate the maximum size of the write buffer portion. Basically, the maximum size of the write buffer portion 52 is determined based on the capability of the controller 30 and other design factors. Thus, the content of the device level register indicating the maximum size of the write buffer portion would not be changed during the operation of the UFS memory module 100.

The controller 30 has another device level register preconfigured to indicate an available size of the write buffer portion. The available size of the write buffer portion 52 is generally set by the electronic device which includes the UFS memory module 100 or determined by the designer of the electronic device. Thus, the content of the device level register indicating the available size of the write buffer portion 52 would not be changed during the operation of the UFS memory module 100. Furthermore, the available size is equal to or smaller than the maximum size of the write buffer portion.

The controller 30 has yet another device level register configured to indicate whether the UFS memory module is in a shared buffer mode or an advanced mode. It is appreciated that the controller of a UFS memory module may include more device level registers which is not described above. Upon review of the present disclosure, persons with ordinary skill in the art are aware that there may be other device level registers arranged in the controller for storing information of the UFS memory module and the write buffer of the UFS memory module. The logic unit level registers are further described in the following paragraphs.

In some embodiments, if the UFS memory module 50 is in a shared buffer mode, the write buffer portion 52 only includes one shared buffer area, which is shared by one or more logic units. In this case, the controller 30 further includes a device level register configured to indicate a usage status of the shared buffer area. For example, the register, which indicates the usage status of the shared buffer area, may be denoted as the remaining size of the shared buffer area. When the remaining size of the shared buffer area is not enough, the host may request the controller 30 to start a turbo write buffer flush operation, so as to flush data stored in the write buffer portion 52 into the normal storage portion 54. By doing so, the write buffer portion 52 is empty again and is ready for being written. It is appreciated that the usage status of the shared buffer area may be denoted in a form other than the remaining size of the shared buffer area. For example, it can be denoted as a percentage of the utilized portion in the shared buffer area.

Figure 2:
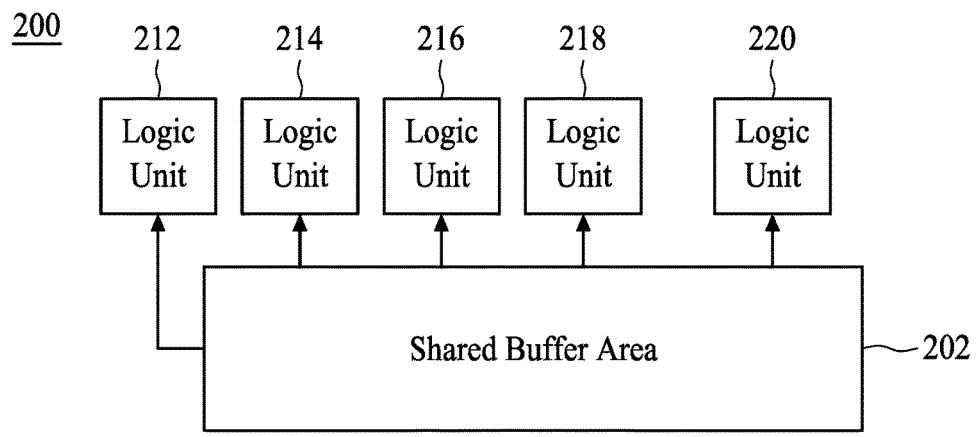
FIG. 2 is a diagram schematically illustrating an arrangement of the write buffer portion when the UFS memory module is in a shared buffer mode according to some embodiments of the present disclosure.

FIG. 2 is a block diagram schematically illustrating an arrangement 200 of the write buffer portion when the UFS memory module is in a shared buffer mode according to some embodiments of the present disclosure. In these embodiments, all logic units of the normal storage portion 212, 214, 216, 218 and 220 share one buffer area (i.e., shared buffer area 202). The data received from the host, to be stored in any logic unit of the UFS memory module is temporarily stored in the shared buffer area 202 while the turbo write operation is enabled. When the usage status indicates that the remaining size of the shared buffer area 202 is enough, the data to be stored are sequentially written into the shared buffer area 202. When the usage status indicates that the remaining size of the shared buffer area 202 is not enough, the host may send an instruction to start the turbo write buffer flush operation. Once a turbo write buffer flush operation is started, data in the shared buffer area 202 would be flushed into the normal storage portion. That is, the data stored in the shared buffer area 202 would be distributed into corresponding logic units and stored therein stably.

For example, if the size of the shared buffer area is 2 GB and a batch of data with the size of 2.4 GB is transmitted from the host to the UFS memory module, the data may be assigned to a plurality of logic units (e.g., logic unit 212, 214 and 218). The data to be stored in logic units 212, 214 and 218 may be 800 MB, 800 MB and 800 MB. When the data are sequentially written into the shared buffer area 202, the remaining size of the shared buffer area 202 is changed from 2 GB to 1200 MB after the data for logic unit 212 is written into the shared buffer area 202, and then the remaining size of the shared buffer area 202 is changed from 1200 MB to 400 MB after the data for logic unit 214 is written into the shared buffer area 202. Afterward, the remaining size of the shared buffer area 202 is not enough to write data to be stored in logic unit 218, which has the size of 800 MB. In response, the host may send an instruction to start the turbo write buffer flush operation, so that all of the data in the shared buffer area 202 (i.e., data for the logic unit 212 and data for the logic unit 214) would be flushed into corresponding logic units in the normal storage portion (i.e., the logic units 212 and 214). By doing so, the shared buffer area 202 would be empty and the remaining sized of the shared buffer area 202 is changed to 2 GB. Then, data to be stored in logic unit 218 would be written into the shared buffer area 202. If the host finds that no more data are to be written to the shared buffer area 202, it may send the instruction to start the turbo write buffer flush operation again. And then, the write operation for logic units 212, 214 and 218 is finished. Afterward, a new batch of data may be transmitted from the host to the UFS memory module. If the turbo write operation is enabled by the host, the new batch of data would be written into the shared buffer area 202 as mentioned above; otherwise, the new batch of data would be written to the normal storage portion directly.

Please refer to FIG. 1 again. If the UFS memory module is in an advanced mode, the write buffer portion includes one or a plurality of dedicated buffer areas; each dedicated buffer area corresponds to one of the plurality of logic units. It should be noted that the number of the dedicated buffer areas may be less than the number of the logic units, which means that some logic units may not have the dedicated buffer areas. The controller further includes a plurality of logic unit level registers indicating the sizes of the dedicated buffer areas for the logic units. In some embodiments, the write buffer portion in the advanced mode may further include a shared buffer area besides the dedicated buffer areas. In this case, the controller may include one or more logic unit level registers indicating the size(s) of the one or more dedicated buffer areas, and may further include a logic unit level register configured to indicate a usage status of the shared buffer area. Additionally, the controller further includes a plurality of logic unit level registers, each indicating whether a logic unit uses the shared buffer area or not.

Figures 3, 4:
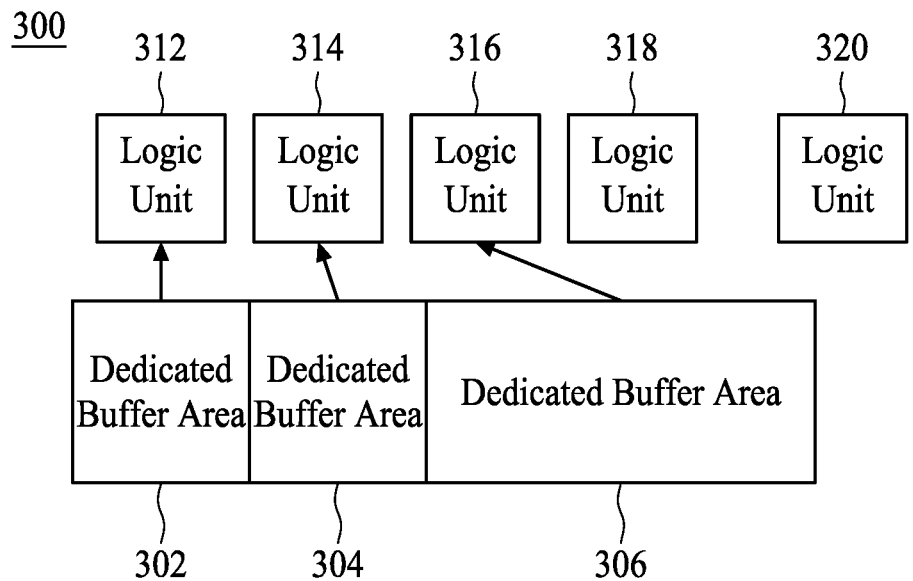
FIG. 3 is a diagram schematically illustrating an arrangement of the write buffer portion when the UFS memory module is in an advanced mode, according to some embodiments of the present disclosure.
FIG. 4 is a table showing the types and the sizes of the buffer areas arranged in the write buffer portion depicted in FIG. 3, according to some embodiments of the present disclosure.

FIG. 3 shows an arrangement 300 of the write buffer portion when the UFS memory module is in an advanced mode according to some embodiments of the present disclosure. In this embodiment, the write buffer portion is divided into a plurality of dedicated buffer areas (e.g., dedicated buffer areas 302, 304 and 306). No shared buffer areas are arranged. Each dedicated buffer area is dedicated to one logic unit and may have a different size. For example, the dedicated buffer area 302 is dedicated to logic unit 312 and has a size of 512 MB; the dedicated buffer area 304 is dedicated to logic unit 314 and has a size of 512 MB; and the dedicated buffer area 306 is dedicated to logic unit 316 and has a size of 1 GB. In this case, some logic units (e.g., the logic units 318 and 320) may not have dedicated buffer areas and thus may not support the turbo write operation.

FIG. 4 is a table showing the types and the sizes of buffer areas arranged in the write buffer portion depicted in FIG. 3 according to some embodiments of the present disclosure. In the current embodiments, the write buffer portion is in the advanced mode, and includes only dedicated buffers. The content of the table is stored in logic unit level registers of the controller of the UFS memory module. Particularly, each box in the field "Mode" for a logic unit corresponds to a logic unit level register indicating the type of the buffer area for the logic unit. For example, if the register stores bit "0," the buffer area utilized by the logic unit is a shared buffer area; the register stores bit "1," the buffer area utilized by the logic unit is not a shared buffer area (i.e. the logic unit uses a dedicated buffer area or no buffer area). Each box in the field "Size" for a logic unit corresponds to a logic unit level register indicating the sizes of the dedicated buffer area of the logic unit or the remaining size of the shared buffer areas used by the logic unit.

As a result, the type and the sizes of buffer areas arranged in the write buffer portion for logic units can be clearly identified by the table of FIG. 4. It can be seen from the table of FIG. 4 that the logic unit 312 has a dedicated buffer area 302 with the size of 512 MB; the logic unit 314 has a dedicated buffer area 304 with the size of 512 MB; and the logic unit 316 has a dedicated buffer area 306 with the size of 1 GB. In FIG. 4, the sizes of dedicated buffers of logic units 318 and 320 are indicated as zero, which means that no dedicated buffer area is assigned to the logic units 318 and 320.

It is appreciated that each of the dedicated buffer area may have the same size, or a different size. In the current embodiments, the sum of the sizes of the dedicated buffers should be equal to the available size of the write buffer portion. For example, in this embodiment, the available size of the turbo write buffer is 2 GB, and the sum of the size of each dedicated buffer area, 512 MB (corresponding to logic unit 312)+512 MB (corresponding to logic unit 314)+1 GB (corresponding to logic unit 316)+0 MB (corresponding to logic unit 318)+0 MB (corresponding to logic unit 320), is equal to 2 GB.

It is also appreciated that in some circumstances, the column "Mode" in the table of FIG. 4 can thus be omitted if no shared buffer area is utilized. In this case the registers designed for storing the content of boxes in the column "Mode" can be used for other purposes.

Figures 5, 6:
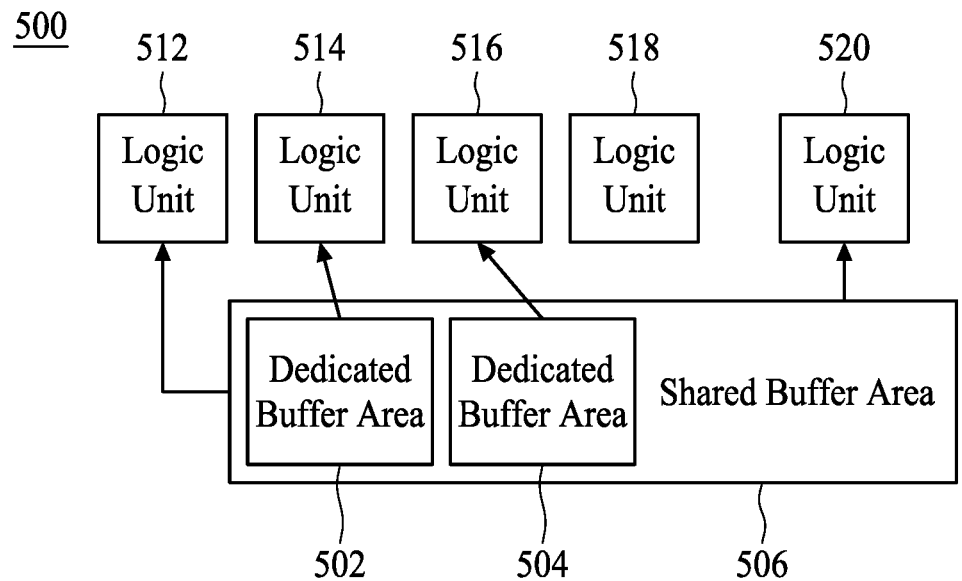
FIG. 5 is a diagram schematically illustrating an arrangement of the write buffer portion when the UFS memory module is in an advanced mode, according to some embodiments of the present disclosure.
FIG. 6 is a table showing the types and the sizes of the buffer areas arranged in the write buffer portion depicted in FIG. 5, according to some embodiments of the present disclosure.

FIG. 5 shows an arrangement 500 of the write buffer portion when the UFS memory module is in an advanced mode according to some embodiments of the present disclosure. In this embodiment, the write buffer portion is divided into a plurality of dedicated buffer areas (e.g., the dedicated buffer areas 502 and 504) and a shared buffer area (e.g. the shared buffer 506). Each dedicated buffer area is dedicated to one logic unit and may have the same or different size. For example, the dedicated buffer area 502 is dedicated to the logic unit 514 and has a size of 512 MB; and the dedicated buffer area 504 is dedicated to the logic unit 516 and has a size of 512 MB. The shared buffer 506 has a size of 1G and is shared by the logic units 512 and 520. No buffer area is assigned to the logic unit 518 and thus the logic unit 518 does not support the turbo write operation. It is appreciated that, according to the present disclosure, there may be other numbers of dedicated buffer areas and may be more than one shared buffer areas. The arrangement of the write buffer portion is not limited to the above example.

FIG. 6 is a table showing the types and the sizes of the buffer areas arranged in the write buffer portion depicted in FIG. 5 according to some embodiments of the present disclosure. In the current embodiments, the write buffer portion is in the advanced mode, and includes a plurality of dedicated buffers and one shared buffer area. The content of the table are stored in logic unit level registers of the controller of the UFS memory module. Particularly, each box in the field "Mode" for a logic unit corresponds to a logic unit level register indicating the type of the buffer area for the logic unit. For example, if the register stores bit "0," the buffer area utilized by the logic unit is a shared buffer area; if the register stores bit "1," the buffer area utilized by the logic unit is not a shared buffer area (i.e. the logic unit uses a dedicated buffer area or no buffer area). For a logic unit having a dedicated buffer area, the box in the field "Size" for the logic unit corresponds to a logic unit level register indicating the sizes of the dedicated buffer areas of the logic unit. For a logic unit using a shared buffer area, the box in the field "Size" for the logic unit corresponds to a logic unit level register indicating the usage status of the shared buffer area. The usage status may be denoted as the remaining size of the shared buffer area, or may be denoted as a percentage of the utilized portion of the shared buffer area.

As a result, the type and the sizes of buffer areas arranged in the write buffer portion for logic units can be clearly identified by the table of FIG. 6. It can be seen from the table of FIG. 6 that the logic unit 512 uses a shared buffer area 506 with remaining size of 1 GB; the logic unit 514 has a dedicated buffer area 502 with the size of 512 MB; and the logic unit 516 has a dedicated buffer area 504 with the size of 512 MB. In FIG. 6, the size of dedicated buffer of logic unit 518 is indicated as zero, which means that no dedicated buffer area is assigned to the logic unit 518.

It is appreciated that each of the dedicated buffer areas may have the same size, or a different size. It is also appreciated that, according to the present disclosure, there may be other numbers of dedicated buffer areas and may be zero, one, or more shared buffer areas in a write buffer portion. The arrangement of the write buffer portion is not limited to the above examples.

In some cases, when a batch of data is transmitted from the host to the UFS memory module, the data may be assigned to one or more logic units (e.g., logic units 512 and 520). Since the logic units 512 and 520 correspond to the shared buffer area 506, the data to be stored in the logic units 512 and 520 are sequentially written into the shared buffer area 506. Once there is data written into the shared buffer area 506, a part of the shared buffer area 506 is used. Thus, the content of the logic unit level register indicating the usage status of the shared buffer area 506 is changed. For example, if the data to be written into the logic unit 512 is 300 MB, the data to be written into the logic unit 520 is 200 MB, and the remaining size of the shared buffer area 506 is 1 GB, the content of the boxes in the field "Size" for logic unit 512 in FIG. 6 are changed from 1 GB to 700 MB after the data for logic unit 512 is written into the shared buffer area 506; and then the content of the box in the field "Size" for logic unit 520 in FIG. 6 are changed from 700 MB to 500 MB after the data for logic unit 520 is written into the shared buffer area 506. If the host finds that no more data are to be written to the shared buffer area 506, it may send the instruction to start the turbo write buffer flush operation again. That is, all of the data in the shared buffer area 506 (i.e., data for the logic units 512 and 520) would be flushed into the corresponding logic units in the normal storage portion (i.e., the logic units 512 and 520). And then, the write operation for logic units 512 and 520 is finished.

In some cases, when a batch of data is transmitted from the host to the UFS memory module, the data may be assigned to one or more logic units (e.g., logic units and 516). The data to be stored in logic units 514 and 516 are sequentially written into the buffer area 502 and the dedicated buffer area 504. If the batch of data has been written into the write buffer portion entirely, the host may send an instruction to start the turbo write buffer flush operation. Afterward, a new batch of data may be transmitted from the host to the UFS memory module.

Figure 7:
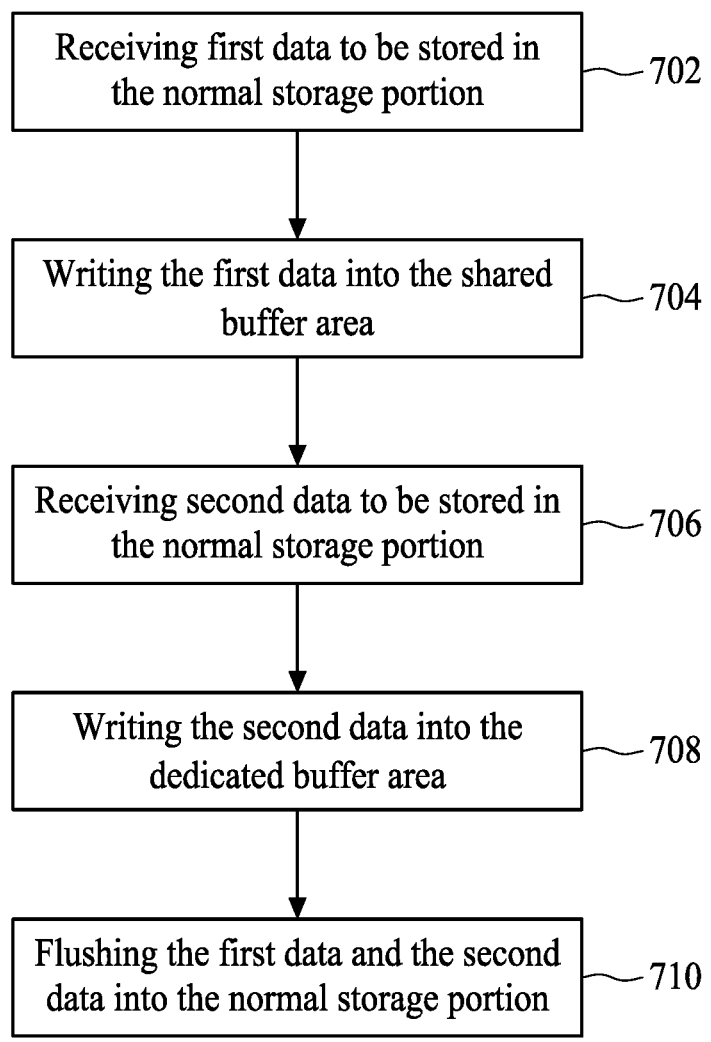
FIG. 7 illustrating a flow chart of a method for operating a UFS memory module according to some embodiments of the present disclosure.

FIG. 7 illustrates a flow chart of a method for operating a UFS memory module according to some embodiments of the present disclosure. As depicted in FIG. 7, the method 700 includes the following steps:

Step 702: receiving first data to be stored in the normal storage portion;

Step 704: writing the first data into the shared buffer area;

Step 706: receiving second data to be stored in the normal storage portion;

Step 708: writing the second data into the dedicated buffer area; and

Step 710: flushing the first data and the second data into the normal storage portion.

It is appreciated that one essential feature of the subject disclosure, among others, is that the data received from a host to be stored in the normal storage portion can be temporarily stored in the shared buffer area and/or the dedicated buffer area and then be flushed into the normal storage portion. Persons with ordinary skills in the art would understand that the order of the above steps can be adjusted. For example, Step 706 may be performed before Step 704 and Step 708 may be performed before Step 704. Persons with ordinary skills in the art would also understand that some steps in FIG. 7 may be combined to one step (e.g. Steps 702 and 706 may be combined), and some steps may be divided (e.g. Step 710 may be divided into one step for flushing the first data and one step for flushing the second data). According to the present disclosure, the method for operating the UFS memory module is not limited to the embodiment shown in FIG. 7.

It can be seen that the shared buffer areas and the dedicated buffers have their own advantages. The shared buffer area provides a more space-efficient way to arrange the write buffer portion for a plurality of logic units. On the other hand, the turbo write operation with the dedicated buffer areas is simpler that with the shared buffer area. The size of the dedicated buffer area may be equal to the size of its corresponding logic unit. Under such arrangement, unlike with the shared buffer area, the controller does not need to change the usage status of the dedicated buffer area. Furthermore, the host does not need to watch the usage status of the buffer areas all the time, and may send the instruction for starting the turbo write buffer flush operation after all data are written into the write buffer portion.

The present disclosure provides an arrangement of the write buffer portion of the UFS memory module. The UFS memory module may be in a shared buffer mode, where only a shared buffer area is included in the write buffer portion, or the UFS memory module may be in an advanced mode, wherein dedicated buffer areas are included in the write buffer portion. Thus, the present disclosure provides a more flexible arrangement to assign the turbo write buffers to the logic units of the normal storage portion of the flash memory, so as to adapt with the usage of the UFS memory module.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A Universal Flash Storage (UFS) memory module, comprising:
   an input/output interface including:
      a clock pin for receiving a reference clock signal from a host;
      a pair of differential input pins for receiving data from the host; and
      a pair of differential output pins for transmitting data to the host;
   a flash memory including:
      a write buffer portion; and
      a normal storage portion having a plurality of logic units; and
   a controller including:
      a processor;
      a first register indicating a maximum size of the write buffer portion;
      a second register indicating an available size of the write buffer portion; and
      a third register indicating whether the UFS memory module is in a shared buffer mode or an advanced mode;
   wherein if the third register indicates the UFS memory module is in the shared buffer mode, the write buffer portion only includes a first shared buffer area; and if the third register indicates the UFS memory module is in the advanced mode, the write buffer portion includes at least one dedicated buffer area, each dedicated buffer area corresponding to one of the plurality of logic units.

2. The UFS memory module of claim 1, wherein if the third register indicates the UFS memory module is in the shared buffer mode, the controller further includes a fourth register indicating a usage status of the first shared buffer area.

3. The UFS memory module of claim 2, wherein the usage status of the first shared buffer area may be denoted as a remaining size of the first shared buffer area.

4. The UFS memory module of claim 2, wherein the usage status of the first shared buffer area may be denoted as a percentage of a utilized portion of the first shared buffer area.

5. The UFS memory module of claim 1, wherein if the third register indicates the UFS memory module is in the advanced mode, the controller further includes a plurality of fifth registers, each fifth register for one of the plurality of logic units, and each fifth register indicating a size of a dedicated buffer area for a corresponding logic unit.

6. The UFS memory module of claim 1, wherein if the third register indicates the UFS memory module is in the advanced mode, the write buffer portion further includes a second shared buffer area.

7. The UFS memory module of claim 6, wherein the controller further includes at least one sixth register for the at least one dedicated buffer area, each sixth register for one of the at least one dedicated buffer area, and each sixth register indicating a size of a dedicated buffer area.

8. The UFS memory module of claim 6, wherein the controller further includes a seventh register indicating a usage status of the second shared buffer area.

9. The UFS memory module of claim 8, wherein the usage status of the second shared buffer area may be denoted as a remaining size of the second shared buffer area.

10. The UFS memory module of claim 8, wherein the usage status of the second shared buffer area may be denoted as a percentage of a utilized portion of the second shared buffer area.

11. The UFS memory module of claim 6, wherein the controller further includes a plurality of eighth registers, each eighth register for one of the plurality of logic units, and each eighth register indicating whether a logic unit uses the second shared buffer area.

12. A controller of a flash memory including a write buffer portion and a normal storage portion having a plurality of logic units, the controller comprising:
   a processor;
   a first register indicating a maximum size of the write buffer portion;
   a second register indicating an available size of the write buffer portion; and
   a third register indicating the flash memory is in a shared buffer mode or an advanced mode;
   wherein if the third register indicates the flash memory is in the shared buffer mode, the write buffer portion only includes a first shared buffer area; and if the third register indicates the flash memory is in the advanced mode, the write buffer portion includes at least one dedicated buffer area, each dedicated buffer area corresponding to one of the plurality of logic units.

13. The controller of claim 12, wherein if the third register indicates the flash memory is in the shared buffer mode, the controller further includes a fourth register indicating a usage status of the first shared buffer area.

14. The controller of claim 13, wherein the usage status of the first shared buffer area may be denoted as a remaining size of the first shared buffer area.

15. The controller of claim 13, wherein the usage status of the first shared buffer area may be denoted as a percentage of a utilized portion of the first shared buffer area.

16. The controller of claim 12, wherein if the third register indicates the flash memory is in the advanced mode, the controller further includes a plurality of fifth registers, each fifth register for one of the plurality of logic units, and each fifth register indicating a size of a dedicated buffer area for a corresponding logic unit.

17. The controller of claim 12, wherein if the third register indicates the flash memory is in the advanced mode, the write buffer portion further includes a second shared buffer area.

18. The controller of claim 17, wherein the controller further includes at least one sixth register for the at least one dedicated buffer area, each sixth register for one of the at least one dedicated buffer area, and each sixth register indicating a size of a dedicated buffer area.

19. An electronic device comprising the UFS memory module of claim 1.

20. A method for operating a Universal Flash Storage (UFS) memory module, the UFS memory module including a flash memory having a write buffer portion and a normal storage portion, the write buffer portion having a dedicated buffer area and a shared buffer area, the method comprising:
   receiving, from the host, first data to be stored in the normal storage portion of the flash memory;
   writing the first data into the shared buffer area of the write buffer portion of the flash memory;
   receiving, from the host, second data to be stored in the normal storage portion of the flash memory;
   writing the second data into the dedicated buffer area of the write buffer portion of the flash memory; and
   flushing the first data and the second data into the normal storage portion of the flash memory.

* * * * *